US006996913B2

(12) United States Patent
Lum et al.

(10) Patent No.: US 6,996,913 B2
(45) Date of Patent: Feb. 14, 2006

(54) CIRCUMFERENTIAL MEASUREMENT OF TUBULAR MEMBERS

(75) Inventors: Matthew K. S. Lum, Mercer Island, WA (US); Albert E. Seifert, Seattle, WA (US); Mark L. Younie, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/767,552

(22) Filed: Jan. 29, 2004

(65) Prior Publication Data

US 2005/0166414 A1 Aug. 4, 2005

(51) Int. Cl.
 *G01B 5/08* (2006.01)
 *G01B 7/12* (2006.01)
 *G01B 7/287* (2006.01)

(52) U.S. Cl. .......................... 33/550; 33/555.1; 33/552

(58) Field of Classification Search .................. 33/549, 33/550, 551, 552, 553, 554, 555, 555.1, 555.2, 33/548; 73/865.8, 865.9, 49.5, 49.6; 72/416, 72/471
See application file for complete search history.

(56) References Cited

U.S. PATENT DOCUMENTS

| | | | | |
|---|---|---|---|---|
| 86,308 A | * | 1/1869 | Jones | 33/555.2 |
| 470,912 A | * | 3/1892 | Durand | 33/557 |
| 2,801,475 A | * | 8/1957 | Meyer, Jr. | 33/543.1 |
| 2,863,223 A | * | 12/1958 | Reicherter | 33/555.1 |
| 3,303,572 A | * | 2/1967 | Vreeland, Jr. | 33/544.5 |
| 3,648,377 A | * | 3/1972 | Witzke | 33/560 |
| 3,754,431 A | * | 8/1973 | Ramdohr | 72/416 |
| 4,027,527 A | | 6/1977 | Bennett et al. | |
| 4,099,418 A | | 7/1978 | Bennett et al. | |
| 4,140,001 A | * | 2/1979 | Moulton | 72/416 |
| 4,240,206 A | * | 12/1980 | Baresh et al. | 33/558 |
| 4,274,206 A | | 6/1981 | Moolenaar | |
| 4,309,128 A | | 1/1982 | Williams | |
| 4,531,391 A | * | 7/1985 | Engman | 72/19.6 |
| 4,543,725 A | * | 10/1985 | Golinelli et al. | 33/555.1 |
| 4,596,076 A | * | 6/1986 | Sigg | 33/555 |
| 4,695,729 A | * | 9/1987 | Monno et al. | 250/358.1 |
| 4,805,311 A | * | 2/1989 | Fuchs | 33/555.1 |
| 4,807,479 A | * | 2/1989 | Sako et al. | 73/730 |

(Continued)

FOREIGN PATENT DOCUMENTS

JP 61173105 A * 8/1986

(Continued)

OTHER PUBLICATIONS http://www.rinkermaterials.com/hydroconduit/infobriefs/i2 03.htm; Rinker/Hydro Co; Info Series, Pipe Deflection; 2003; pp. 1-5.

(Continued)

*Primary Examiner*—R. Alexander Smith
(74) *Attorney, Agent, or Firm*—Alston & Bird LLP

(57) ABSTRACT

An apparatus and method are provided for circumferentially measuring cross-sectional characteristics of a tubular member. The apparatus includes first and second template members that cooperably define an aperture for receiving the tubular member. At least one of the template members is adjustable so that the aperture can be adjusted between open and closed positions. A measurement device can be configured to detect the relative position of the first and second template members, thereby measuring the relative adjustment of the members between the open and closed positions. This measurement is indicative of the cross-sectional size of the tubular member, e.g., for determining the diameter of the tubular member. Alternatively, multiple measurement devices can respond to a contact force between the measurement devices and the tubular member, e.g., to determine a variation in wall thickness of the tubular member.

36 Claims, 5 Drawing Sheets

U.S. PATENT DOCUMENTS

| | | | | |
|---|---|---|---|---|
| 5,014,440 | A | * | 5/1991 | Lessi et al. .................... 33/557 |
| 5,335,422 | A | * | 8/1994 | Ferguson .................... 33/553 |
| 5,351,410 | A | * | 10/1994 | Hainneville .................. 33/542 |
| 6,286,223 | B1 | * | 9/2001 | Iwamoto .................... 33/555.1 |
| 6,457,338 | B1 | * | 10/2002 | Frenken ...................... 72/20.1 |
| 6,754,973 | B1 | * | 6/2004 | Takahashi .................... 33/551 |
| 2003/0079359 | A1 | * | 5/2003 | Richards .................... 33/555.1 |
| 2003/0110872 | A1 | | 6/2003 | Powers et al. |
| 2003/0230131 | A1 | * | 12/2003 | Bowles et al. ................ 72/416 |
| 2005/0056105 | A1 | * | 3/2005 | Delacroix et al. ......... 73/865.8 |
| 2005/0120812 | A1 | * | 6/2005 | Edwin et al. .............. 73/865.8 |

FOREIGN PATENT DOCUMENTS

JP          62228302 A    * 10/1987

OTHER PUBLICATIONS http://www.pei.org/FRD/SurveyofFlexPipe.htm; VP-ASP shopping cart, Survey Of Flexible Piping Systems; ICF Incorporated, Fairfax, VA; Mar. 1997; pp. 1-18.

http://www.resistoflex.com/support.htm; Resistoflex Plastic Lined Pipe & Fittings, Support of Resistoflex Plastic-Lined Piping Products; 2000; pp. 1-2.

http://www.rinkermaterials.com/hydroconduit/infobriefs/i103.htm; Rinker/Hydro Co; Info Series, Concrete Encasement of Pipe; 2003; pp. 1-2.

http://www.NCPI.org.com; NCPI Tech Notes; Deflection: Does It Matter?; TN 6-6 (2); date unknown.

http://www.icindustries.com/tezet/Modules.htm; TeZet® Tube, Pipe, Wire Design, Manipulation and Bending Software Solutions; InterContinental Industries, 2001; pp. 1-5.

http://www.plasticpipe.org/pubs/download/notes/Tn19-00.pfd., Pipe Stiffness for Buried Gravity Flow Pipes TN-19/2000; pp. 1-12.

http://www.sms-meer.de/untern/euntern.html; Leading edge technology—SMS Meer at a glance; pp. 1-3.

http://www.sms-meer.de/cc/nahtlos/nahtlw.html; Nahtlosrohranlagen—warm; 1 page.

http://www.sms-meer.de/cc/auto/carta/pdf/Position_ProspectsSeamless.pdf; Position and Future Prospects of the Seamless Steel Tube; H.J. Pehle, SMS Meer GmbH, Monchengladbach; pp. 1-46.

* cited by examiner

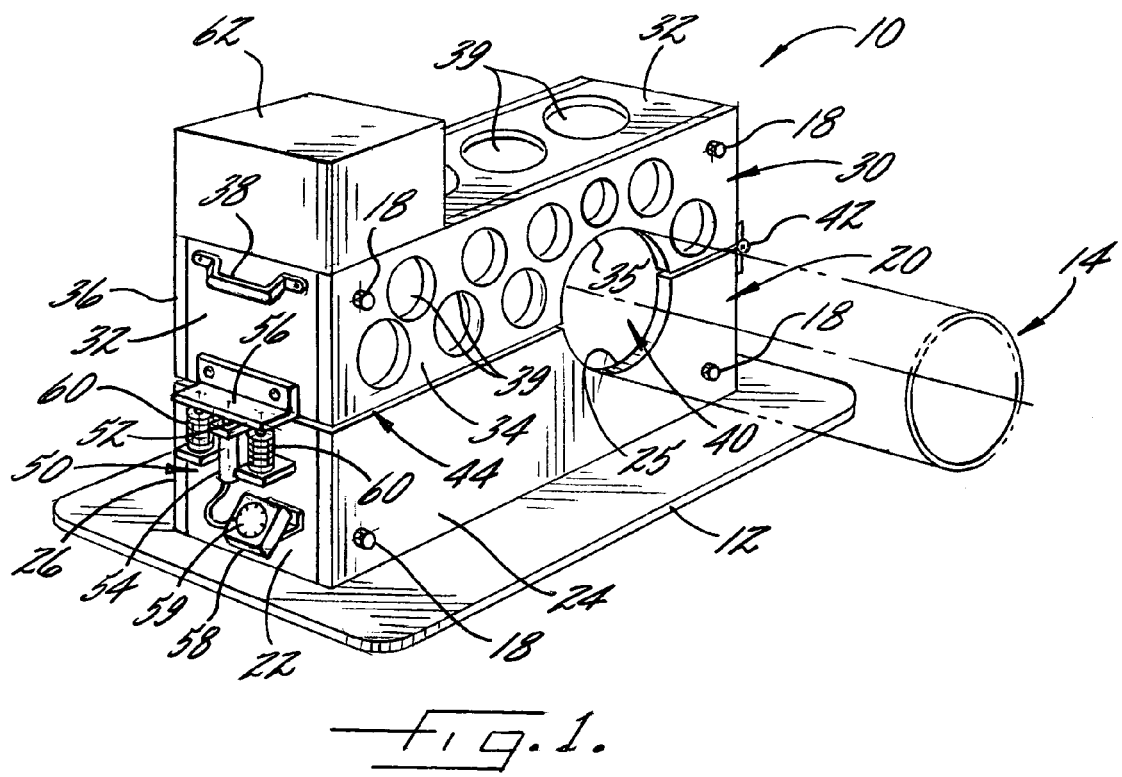

CIRCUMFERENTIAL MEASUREMENT OF TUBULAR MEMBERS

BACKGROUND OF THE INVENTION

1) Field of the Invention

The present invention relates to apparatuses and methods for measuring a tubular member and, more specifically, for measuring one or more cross-sectional characteristics of the tubular member.

2) Description of Related Art

Tubular members such as pipes, ducts, and the like are used in various applications, for example, as transport passageways through which gases can be delivered for heating, ventilation, and air conditioning. In other applications, pipes, ducts, and other tubular members can also be used to deliver liquids, such as water, waste liquids, and the like. In the aircraft industry, tubular members are provided as ducts in environmental control systems (ECS) of modern commercial aircraft. An ECS and, hence, the ducts therein, provides air throughout the cabin of the aircraft in order to provide air as required for the respiratory needs of the occupants, to clear contaminants and odors from the cabin air, to control the temperature and humidity of the cabin environment, and to provide adequate cabin pressure. Air can also be delivered throughout the aircraft for de-icing of the aircraft, for heating of the cargo area of the aircraft, for pneumatic systems, and for cooling hydraulic and electrical systems.

The tubular members used for ducts, such as for the ECS of an aircraft, are typically formed of composite or metallic materials. Common composite reinforcement materials include fiberglass (BMS 8-80, 8-139, or 8-226), graphite (BMS 8-168), and Kevlar® (BMS 8-264), a registered trademark of E.I. du Pont de Nemours and Company. These reinforcement materials, which can be provided as sheets, fibers, or the like, can be preimpregnated with epoxy or polyester resin, which hardens when subjected to heat and pressure. Alternatively, the reinforcement materials can be reinforced with thermoplastic materials such as polyetherimide (PEI), which is available under the trade name Ultem®, a registered trademark of General Electric Company. In either case, ducts formed of composite materials can be lightweight and strong. Alternatively, the tubular members can be relatively thin-walled structures that are formed of metals such as steel.

Tubular members, such as composite ducts, are typically dimensionally tested, e.g., by measuring the circumference or diameter of the member to see if the cross-sectional size of the member matches the desired size. For example, the inner or outer diameter of the tubular member can be measured using a gauge, calipers, micrometers, and the like. However, due to the flexible nature of composite materials and many thin-walled structures, the tubular members can flex during testing, thereby reducing the accuracy of the measurement. Alternatively, the tubular member can be measured by extending a flexible measuring tape around the circumference of the member. In the case of a "pi tape," the measurement units marked on the tape are adjusted by the value of the pi constant, i.e., the marked units reflect the linear length of the tape divided by pi. Thus, an operator can quickly determine the diameter of the tubular member by extending the tape around the tubular member and reading the diameter from the circumferential markings on the tape. However, regardless of the units provided on the measuring tape, the measurement made therewith is dependent on the placement of the tape and the reading that is taken by the operator. Thus, like the other mechanical measuring devices listed above, the accuracy of the tape is limited by the ability of the operator.

In yet another conventional method of measurement, an electronic coordinate measuring machine is used to determine relative coordinate positions for several points around the circumferential perimeter of the tubular member. The coordinate positions are then used to determine the cross-sectional size of the member, e.g., by using a "best-fit" technique in which the coordinate positions are matched up with an equation describing a best-fit circle, and a circumference of the member is thereby approximated. The coordinate measuring machine can be capable of very accurately determining the positions of the several points, but the circumference determined by the machine is only an approximate measurement. In particular, if the cross-sectional shape of the member is not circular, the best-fit circle will not accurately correspond to the cross-sectional shape of the member, and the accuracy of the dimensions determined with the machine can be decreased.

Thus, there exists a need for an apparatus and method for accurately measuring the cross-sectional characteristics of a tubular member formed of a thin-walled or otherwise flexible material. The apparatus should be capable of accurately determining at least one characteristic, such as the diameter or wall thickness, of the tubular member, even if the cross-sectional shape of the member does not define a perfect or uniform polygonal shape such as a circle.

SUMMARY OF THE INVENTION

The present invention provides an apparatus and method for accurately measuring the cross-sectional characteristics of a tubular member. The apparatus includes cooperable template members that define an adjustable aperture for receiving the tubular duct. A measurement device detects the adjustment of the members and thereby measures one or more characteristics of the tubular member such as the diameter. The apparatus can urge the tubular member to a reference shape, e.g., if the tubular member in an unconstrained configuration defines an irregular or nonuniform cross-sectional shape. Further, the measurement can be performed accurately with a reduced dependence on the technique of an operator.

According to one embodiment of the present invention, the apparatus includes first and second cooperable template members, which cooperably define the aperture having a cross-sectional reference shape of the tubular member, e.g., a circle. Each of the first and second template members can include two or more plates configured in a spaced relationship. The first and second template members can be connected by a hinge connection and thus rotatably adjustable between open and closed positions. An urging device is configured to apply a predetermined force to the members to urge the members toward the closed position. The measurement device is configured to detect the relative position of the first and second template members, e.g., by measuring a gap between the first and second template members opposite the aperture from the hinge connection. Thus, the measurement device, which can be an electronic device configured to automatically measure the relative position of the template members, measures the relative adjustment of the members between the open and closed positions. The measurement device can also be configured to determine a diameter of the tubular member.

The present invention also provides a method for circumferentially measuring a tubular member. The method includes inserting the tubular member into an aperture defined by the first and second cooperable template members, and adjusting at least one of the template members to at least partially close the aperture, for example, by rotating one of the template members about a hinge connection between the template members. The tubular member is urged, e.g., by applying a predetermined force, to a cross-sectional shape corresponding to the reference shape of the aperture such as a generally circular cross-sectional shape. The relative position of the first and second template members is measured, and a cross-sectional size, such as a diameter, of the tubular member is determined according to the relative position of the first and second template members. The position of the template members can be measured by measuring a gap therebetween, e.g., at a position opposite the aperture from the hinge connection. An electronic measurement device can be configured to measure the relative position of the template members.

Further, the present invention provides an apparatus and method for measuring the tubular member at a plurality of circumferentially spaced locations. For example, measurement devices can be configured to contact the tubular member at the circumferential locations when the aperture is closed so that each measurement device provides an output that is characteristic of a contact force between the measurement device and the tubular member. The measurement devices can be configured to detect a force, pressure, or a stress that is representative of the stiffness of the tubular member. Thus, the variation of the wall thickness of the tubular member can be determined accordingly.

BRIEF DESCRIPTION OF THE DRAWINGS

Figure 4:
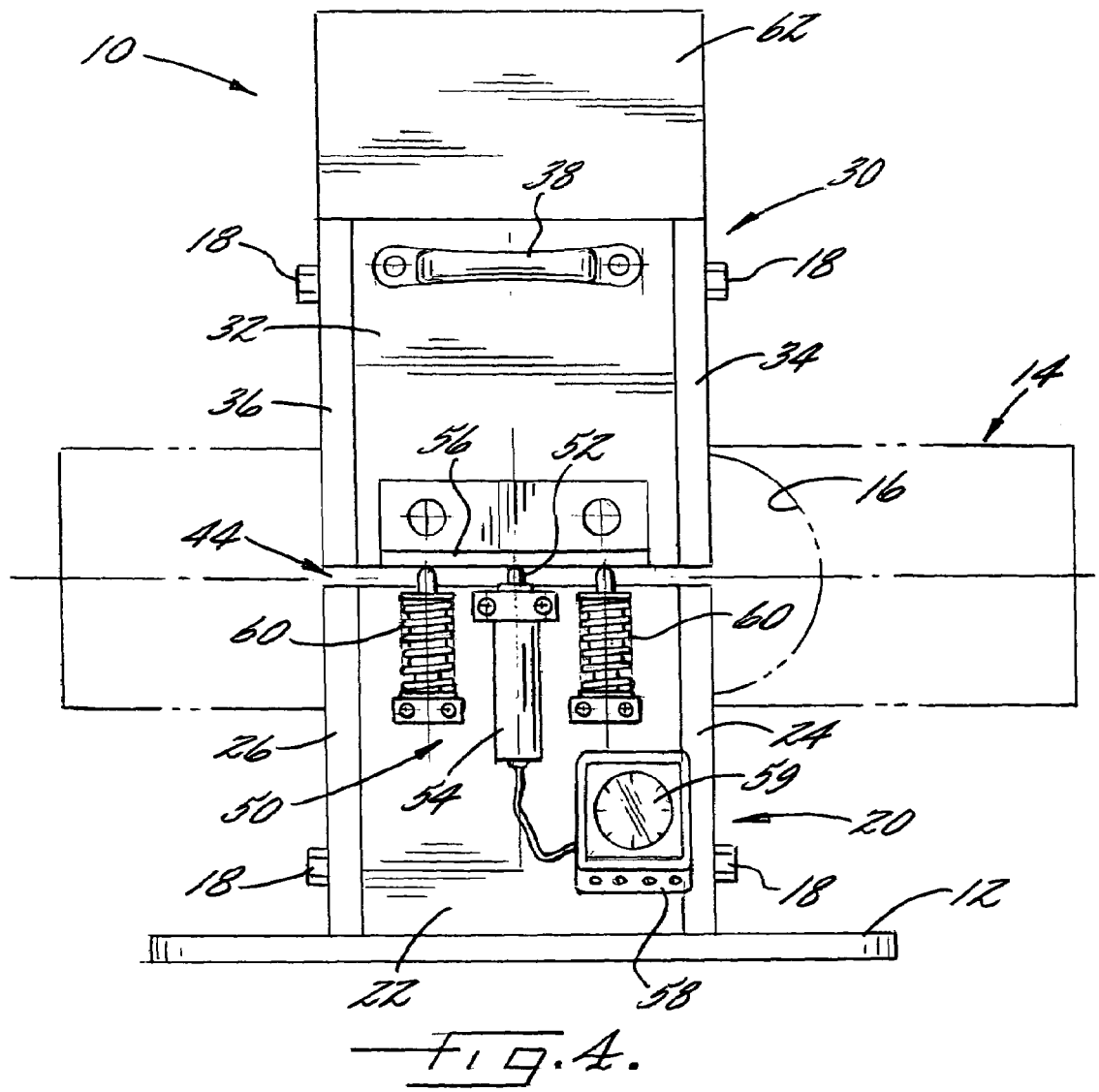
Figure 3:
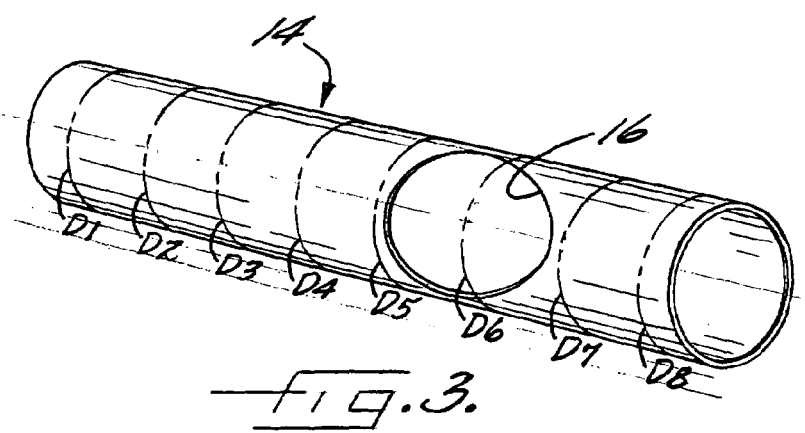
Figure 5:
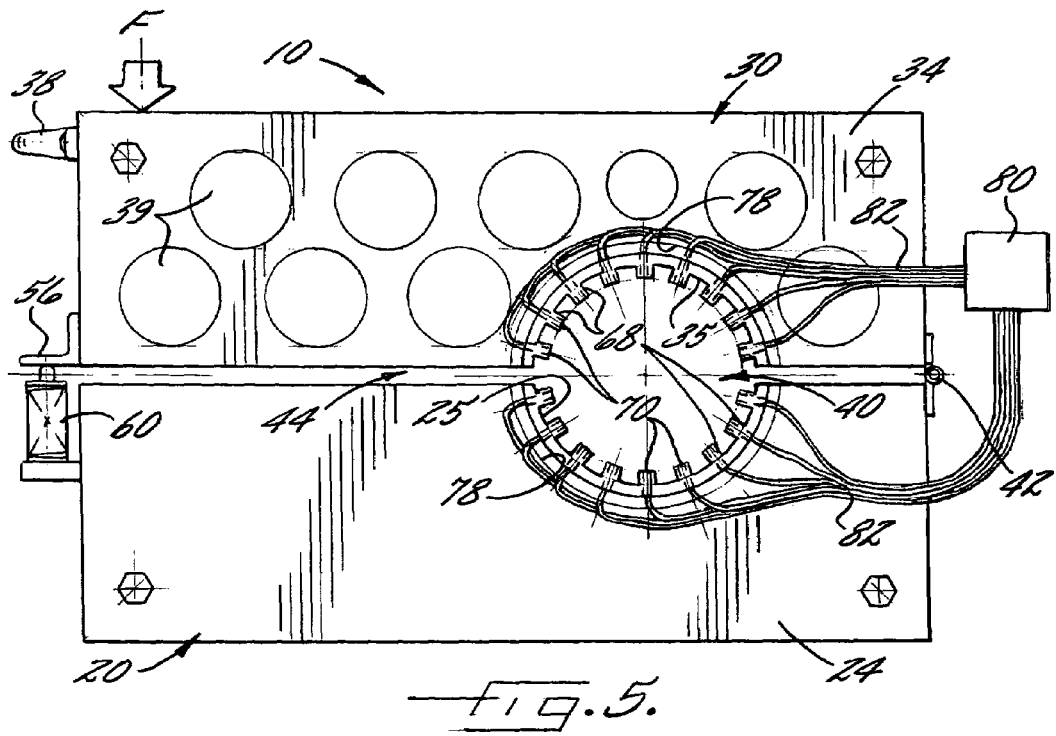
Figure 5A:
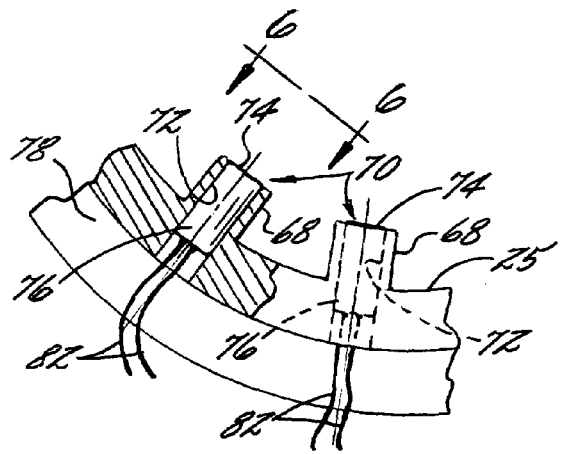
Figure 6:
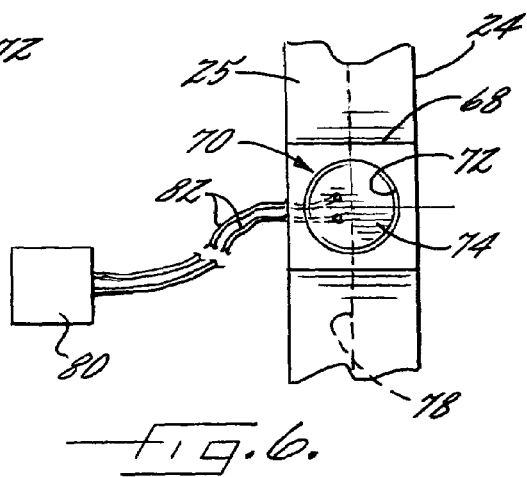
Figure 7:
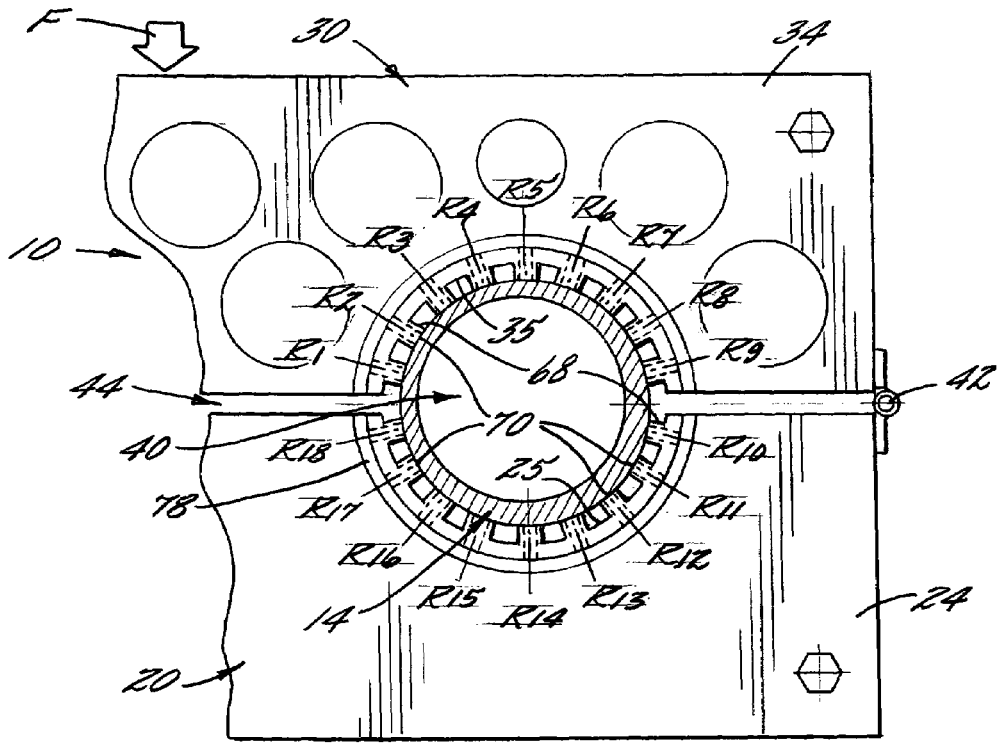
Figure 8:
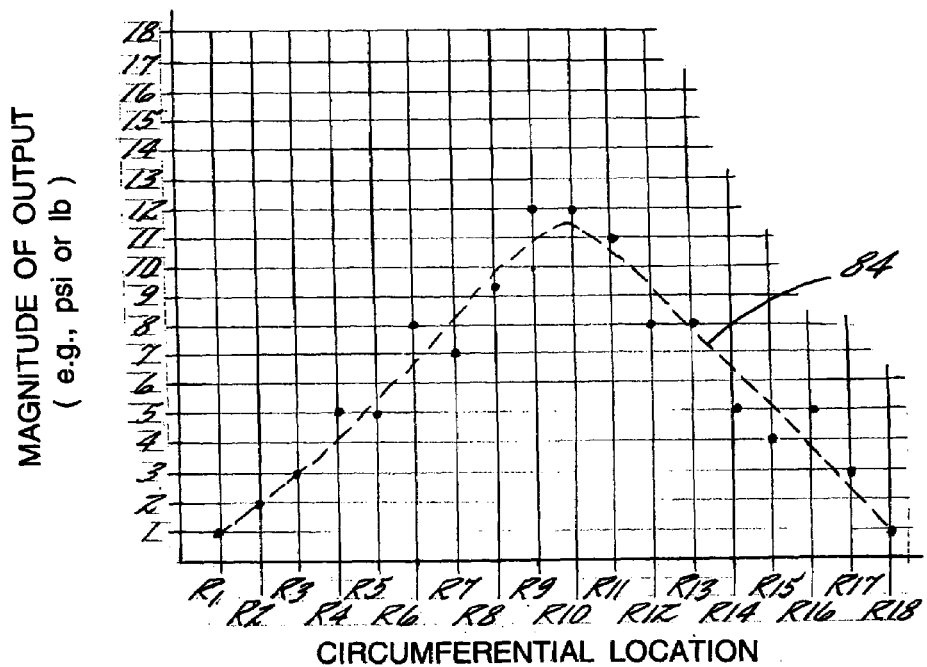
Figure 9:
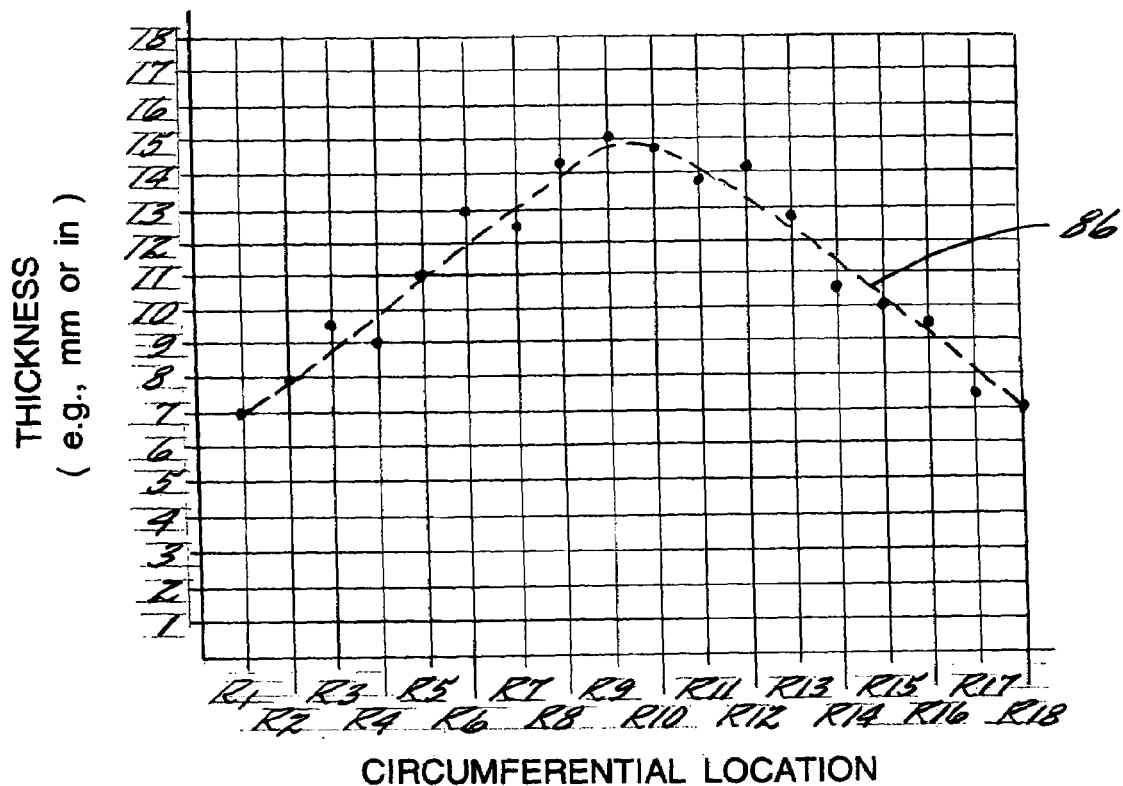
Figure 10:
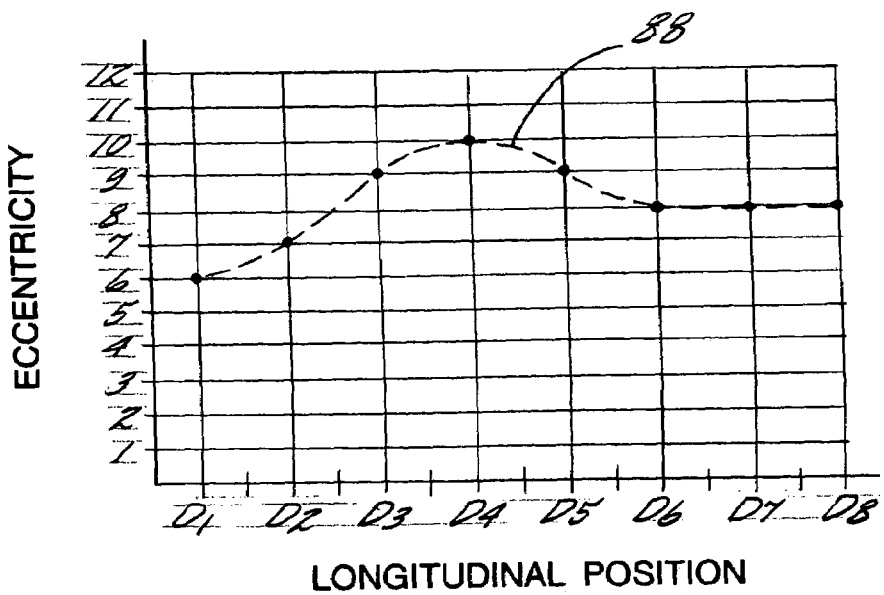

Having thus described the invention in general terms, reference will now be made to the accompanying drawings, which are not necessarily drawn to scale, and wherein:

FIG. 1 is a perspective view of an apparatus for circumferentially measuring a tubular duct according to one embodiment of the present invention;

FIG. 2 is a top view of the apparatus of FIG. 1, shown in an open configuration;

FIG. 3 is a perspective view of a tubular duct that can be measured with the apparatus of FIG. 1;

FIG. 4 is an elevation view of the apparatus of FIG. 1, shown in a closed positioned with the tubular member configured therein for measuring;

FIG. 5 is an elevation view of an apparatus for measuring a tubular duct according to another embodiment of the present invention;

FIG. 5A is an enlarged partially cutaway view of a portion of the apparatus of FIG. 5 illustrating two of the measurement devices thereof;

FIG. 6 is a partial section view of the apparatus of FIG. 5, as seen along line 6—6 of FIG. 5A;

FIG. 7 is a partial elevation view of the apparatus of FIG. 5, shown in a closed position with the tubular member configured therein for measuring;

FIG. 8 is a graph illustrating the magnitudes of the outputs provided by the measurement devices of the apparatus of FIG. 5;

FIG. 9 is a graph illustrating the thickness of the wall of the tubular member at various circumferential locations as measured at a particular longitudinal position using the apparatus of FIG. 5; and FIG. 10 is a graph illustrating the eccentricity of the tubular member as measured at various longitudinal positions using the apparatus of FIG. 5.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, there is shown an apparatus 10 for measuring a tubular member 14 (FIG. 3) according to one embodiment of the present invention. The apparatus 10 can be used for measuring a variety of tubular members 14, such as pipes, ducts, tubes, and the like, which can be formed of metal, plastic, thermoplastic or thermoset composite materials, and other materials. Advantageously, the tubular members 14 can be flexible, such as thin-walled metal members or tubular members 14 formed of flexible polymeric or composite materials. Such tubular members 14 can be used for duct passages in heating, ventilation, and air conditioning systems in aircraft, buildings, and the like. Additionally, the tubular members 14 can be used in a variety of other applications, for example, as flexible pipes for transporting other fluids such as for transporting steam, irrigation, drainage, or delivery of gas, oil, and the like. Further, the tubular members 14 can be used as structural members in building construction, for sports or medical devices, and the like.

The apparatus 10 is configured to circumferentially measure the tubular member 14 to determine one or more cross-sectional characteristics of the tubular member 14. For example, the apparatus 10 can be configured to support the tubular member 14 about a circumference of the tubular member 14 and determine a diameter of the tubular member 14. The diameter or other measurements of the tubular member 14 can be determined at various positions along the length of the member 14, e.g., at each of the longitudinal positions $D_1$–$D_8$ shown in FIG. 3. While the apparatus 10 shown in FIG. 1 is structured to measure a tubular member 14 having a generally circular cross section, it is appreciated that the apparatus 10 in other embodiments can be used to measure tubular members 14 having other cross-sectional shapes including elliptical or oval shapes, rectangular shapes, contoured shapes, or nonuniform shapes.

As illustrated in FIG. 1, the apparatus 10 includes first and second template members 20, 30 that cooperably define an aperture 40 extending therethrough for receiving the tubular member 14. The first template member 20, which is connected to a base 12, includes a support member 22 and two plates 24, 26 that are connected to opposite sides of the support member 22. Similarly, the second template member 30 includes a support member 32 and plates 34, 36 connected to opposite sides thereof. The plates 24, 26, 34, 36 can be connected by bolts 18 to the respective support members 22, 32 such that the plates 24, 26, 34, 36 can be removed for maintenance, repair, or replacement, e.g., with plates of different configurations to define different sizes or shapes of aperture 40. In other embodiments of the present invention, each template member 20, 30 can be formed of multiple additional members, or each template member 20, 30 can be a unitary structure (that is, a template member need not have two separate plates, but may have a single plate or other structure that defines a portion of the aperture).

The first and second plates 24, 26, 34, 36 of each template member 20, 30 can be generally similar in configuration. That is, the first and second plates 24, 26 of the first template member 20 can define a similar arcuate portion of the aperture 40 so that the first template member 20 corresponds to a portion of the curved cross section of the tubular member 14. Similarly, the first and second plates 34, 36 of the second template member 30 can define a similar arcuate portion of the aperture 40 so that the second template member 30 corresponds to the remaining cross section of the tubular member 14. Thus, the first and second template members 20, 30 cooperably define the aperture 40, which corresponds to a reference or nominal cross-sectional shape of the tubular member 14. Alternatively, the first and second plates 24, 26 of the first template member 20 can be define dissimilar portions of the aperture 40, and the first and second plates 34, 36 of the second template member 30 can be correspondingly dissimilar so that the two template members 20, 30 in combination define the aperture 40.

Thus, with the template members 20, 30 configured as shown in FIG. 1, the aperture 40 extends through the apparatus 10. The aperture 40 can be perpendicular to the plates 24, 26, 34, 36, as shown, or the aperture can be disposed at an angle thereto. Also, the plates 24, 26, 34, 36 can define surfaces 25, 27, 35, 37 at the aperture 40, which can be smooth cylindrical surfaces, as shown, or can define a V-shape or other grooves, ridges, or contours. At least one of the first and second template members 20, 30 is preferably adjustable so that the aperture 40 can be opened and closed. For example, the first and second template members 20, 30 can be connected at one end by a hinge 42 so that the second template member 30 can be rotated between an open position (FIG. 2) and a closed position (FIGS. 1 and 4). In other embodiments, the template members 20, 30 can be otherwise adjustably connected, e.g., by rails or posts that extend from one of the members 20, 30 and are slidably received and supported by the other member 20, 30. In the open position, the aperture 40 is open to more easily receive the tubular member 14. The second template member 30 can be adjusted manually, e.g., using a handle 38 provided thereon. Alternatively, in other embodiments of the invention, an actuator, spring, or the like can be provided to achieve or facilitate the relative adjustment of the template members 20, 30. The template members 20, 30 are preferably formed of stiff materials such as aluminum or other metals. Holes 39 can be formed in one or both of the template members 20, 30 to reduce the weight of the members 20, 30 and reduce the energy required for adjustment.

A measurement device 50 is configured to detect the relative position of the first and second template members 20, 30. For example, the measurement device 50 can be a conventional electronic position detection device such as a gauge that includes an adjustably extendable probe 52 that is biased by a spring to an extended configuration. The probe 52 is extendable from a probe housing 54 that is mounted on the first template member 20, and a flange 56 on the second member 30 is structured to contact the probe 52 when the second template member 30 is closed relative to the first structural member 20. Thus, the probe 52 is configured to be extended by the spring from the probe housing 54 when the second member 30 is adjusted toward the open position and retracted into the probe housing 54 as the second template member 30 is adjusted toward the closed position. A digital monitoring device 58 electrically communicates with the probe 52 and is configured to detect the extension or retraction of the probe 52 and thereby measure the relative position of the two template members 20, 30. Other measurement devices can alternatively be used including, e.g., mechanical gauges, linear measuring references, optical measuring devices, and the like.

One or more shock absorption devices 60 can also be provided to reduce the shock on the measurement device 50 during closing of the template members 20, 30. For example, each shock absorption device 60 can include a spring and a damper that are connected to the first template member 20 and configured to be acted on by the flange 56 or another portion of the second template member 30 when the second template member 30 is closed.

The first and second templates 20, 30 can be urged toward the closed position with a predetermined force provided by an urging device 62. The predetermined force can be sufficient to urge a portion of the tubular member 14 to the reference cross-sectional shape defined by the aperture 40. For example, the urging device 62 can be a weight that is placed on the second template member 30 as shown in FIG. 1 to urge the second template member 30 toward the first template member 20, thereby closing the template members 20, 30. The weight 62 is preferably provided at a predetermined position, i.e., so that a uniform force between the first and second template members 20, 30 can be provided during each subsequent operation of the apparatus 10. In other embodiments of the present invention, the urging device 62 that provides the force for closing the template members 20, 30 can be an actuator such as an electrical, pneumatic, or hydraulic actuator. Alternatively, various other urging devices can be used to provide a force for closing the template members 20, 30 including springs, other configurations of weights, magnets, and the like.

Preferably, the aperture 40 defined by the first and second template members 20, 30 corresponds to the reference size of the tubular member 14 when the template members 20, 30 are configured with a small gap 44 therebetween. The gap 44 can be defined between the first plates 24, 34 of the opposite template members 20, 30 and similarly between the second plates 26, 36 of the opposite members 20, 30. Further, the gap 44 can be defined between the members 20, 30 on both sides of the aperture 40, i.e., between the aperture 40 and the hinge 42 and between the aperture 40 and the measurement device 50. Thus, if the cross-sectional size of the tubular member 14 is about equal to the size of the aperture 40, when the tubular member 14 is provided in the aperture 40, the template members 20, 30 can be adjusted toward the closed position to exert an urging force on the tubular member 14 in the aperture 40. The force provided by the urging device 62 can urge the tubular member 14 to a cross-sectional shape corresponding to the shape of the aperture 40, i.e., the reference shape of the tubular member 14. For example, if the reference shape of the aperture 40 is a circle with a diameter of 9 inches, and the tubular member 14 has a generally circular cross-sectional shape with a diameter of about 9 inches, the tubular member 14 can be urged by the template members 20, 30 to the round shape defined by the aperture 40. If the cross-sectional shape of the tubular member 14 is not round, e.g., defines an eccentric or oval cross-section, the template members 20, 30 can urge the tubular member 14 to the round shape of the aperture 40.

Further, the relative position of the template members 20, 30, when closed against the tubular member 14, is indicative of the cross-sectional size of the tubular member 14. That is, if the tubular member 14 has a cross-sectional size that is greater than the size of the aperture 40, the template members 20, 30 will be closed to a lesser extent, and if the cross-sectional size of the tubular member 14 is less than the aperture 40, the template members 20, 30 will be closed to a greater extent. Advantageously, the gap 44 provided between the template members 20, 30 can be sufficiently large that the template members 20, 30 can be closed to decrease the size of the aperture 40 to the minimum size of the tubular members 14 that are to be measured in the apparatus 10.

By measuring the relative position of the first and second template members 20, 30, the cross-sectional size of the tubular member 14 in the aperture 40 can be determined. For example, the measurement device 50 can be used to determine a gap measurement that corresponds to the size of the gap 44 between the template members 20, 30, and the gap measurement can then be used to determine the diameter of the tubular member 14. The correlation between the gap measurement and the diameter of the tubular member 14 generally depends on the structure and configuration of the particular apparatus 10. For example, as illustrated in FIG. 1, the measurement device 50 is configured to measure the relative position of the template members 20, 30 at a position opposite the aperture 40 from the hinge 42, though the measurement device 50 can alternatively be configured at other positions.

According to one embodiment of the illustrated configuration, an empirical correlation between the gap measurement and the diameter of the tubular member 14 was determined to be as follows:

$$\text{Diameter of tubular member} = \frac{X}{\pi}\left(\frac{2.3+D}{15.6}\right)+D$$

where X is the gap measurement of the measurement device 50 in inches and D is the diameter of the reference aperture 40. Thus, for template members 20, 30 defining an aperture 40 with a diameter of 4.25 inches, the diameter of the tubular member 14 is equal to (4.25+0.134X). Similarly, for apparatuses 10 having apertures 40 of diameters equal to 6, 9, and 12.75 inches, the diameter of the tubular members 14 measured therewith can be determined according to the following simplified equations:

6-inch diameter apertures: Diameter of tubular member=6+0.169X 9-inch diameter apertures: Diameter of tubular member=9+0.231X 12.75-inch diameter apertures: Diameter of tubular member=12.75+0.307X The measurement device 50 can be configured to display or otherwise report the gap measurement or the particular characteristic of interest of the tubular member 14. For example, the monitoring device 58 can include a liquid crystal display 59, on which the measurement device 50 can display the gap measurement, i.e., X, in linear measurement units, or the device 50 can perform the necessary mathematical calculation to determine and display the diameter of the tubular member 14.

It is appreciated that the diameters described above are exemplary diameters corresponding to common duct sizes, but the apparatus 10 can similarly be used to measure tubular members 14 of any size, including very small members and very large members. Further, the correlations described above between the gap measurement of the measurement device 50 and the diameter of the tubular members 14 were developed for a particular apparatus 10 and will likely vary for other apparatuses, even apparatuses similar in configuration to the one described.

The apparatus 10 can be calibrated before use or between measurement operations. For example, a calibration tool 64 having a predetermined thickness can be positioned between the first and second template members 20, 30. The calibration tool 64 is shown in dashed lines in FIG. 2 for illustrative clarity. The second template member 30 can be closed with the calibration tool 64 positioned between the template members 20, 30 so that the gap 44 therebetween is equal to the thickness of the calibration tool 64. The measurement device 50 can then be adjusted mechanically or electronically until the device 50 reports a gap measurement, diameter, or other measurement corresponding to the calibration tool 64. For example, the calibration tool 64 can have a first portion defining a thickness corresponding to the gap between the template members 20, 30 when the aperture 40 defines the reference shape, i.e., the desired or nominal cross-sectional shape of the tubular member 14. With the first portion of the calibration tool 64 disposed between the template members 20, 30, the measurement device 50 can be calibrated to the measurement that corresponds to the reference diameter. Other portions of the calibration tool 64 or different calibration tools can also define other thicknesses. For example, second and third portions of the calibration tool can define thicknesses equal to the gap between the members 20, 30 that correspond to diameters of the aperture 40 that are greater and smaller than the reference diameter, e.g., 0.03 inch greater and 0.03 inch less than the reference diameter. Thus, the second and third portions of the calibration tool 64 can be used to calibrate the measurement device 50 for the corresponding diametrical measuring positions. Alternatively, calibration can be performed by other methods, e.g., by disposing a member of known cross-sectional shape in the aperture 40 and adjusting the measurement device 50 accordingly.

In operation, the apparatus 10 is configured to urge the tubular member 14 generally to the cross-sectional shape defined by the aperture 40 and determine the diameter or other cross-sectional characteristics of the tubular member 14 with the tubular member 14 so configured. Thus, if the cross-sectional shape of the tubular member 14 does not correspond precisely to the cross-sectional reference shape of the aperture 40, the tubular member 14 is adjusted to the reference shape before measurement. For example, if the reference shape of the aperture 40 is circular, but the tubular member 14 defines a non-round cross section such as an elliptical cross section, the apparatus 10 urges the tubular member 14 to the round cross-sectional shape and determines the diameter of the tubular member 14 when adjusted to the configuration of the reference shape.

Advantageously, the apparatus 10 can also be used to measure a tubular member 14 that defines one or more features. For example, as shown in FIGS. 3 and 4, the tubular member 14 defines an aperture 16, such as is typically provided for fluidly connecting the tubular member 14 to another tubular member 14 or to an other fluid device. While the aperture would make accurate measurement of the tubular member 14 difficult or impossible using a pi tape or a coordinate measuring machine, the apparatus 10 according to the present invention can measure the diameter of the tubular member 14 proximate to or coincident with the aperture 16, e.g., at the longitudinal position $D_6$ shown in FIG. 3.

Further, while the foregoing discussion describes the determination of the diameter of the tubular member 14, it is also appreciated that other cross-sectional characteristics of the tubular member 14 can similarly be determined. For example, the measurement device 50 can be configured to determine the circumference of the tubular member 14, the cross-sectional area of the tubular member 14, the wall thickness and/or eccentricity of the tubular member 14, and the like.

FIGS. 5, 5A, and 6 illustrate an apparatus 10 according to another embodiment of the present invention in which a plurality of measurement devices 70 are located circumferentially around the aperture 40. The measurement devices 70 extend radially inward from one or both of the template members 20, 30 and are configured to contact the tubular member 14 when the apparatus 10 is adjusted to the closed position. For example, the surfaces 25, 27, 35, 37 of the plates 24, 26, 34, 36 that define the aperture 40 can define tooth-like portions 68 that extend radially inward and correspond generally to the circumference of the tubular member 14. As shown in FIG. 5A, each of the tooth-like portions 68 defines a radial bore 72 extending through a respective one of the surfaces 25, 27, 35, 37, and a measurement device 70 is disposed in each bore 72 so that a contact end 74 of the measurement device 70 is located slightly radially inward from the corresponding tooth-like portion 68. A mounting end 76 of each measurement device 70 can be mounted in the respective bore 72, and the mounting end 76 of each device 70 can be connected to the respective template member 20, 30, e.g., by a threaded (screw) mount or other connection. In addition, a slot 78 or other aperture in the plates 24, 26, 34, 36 can provide access to the mounting ends 76 of the measurement devices 70, e.g., through which connection wires 82 from each measurement device 70 can extend. The apparatus 10 can also include an electronic controller 80 that is configured to process the outputs of the measurement devices 70. For example, the measurement devices 70 can electrically communicate with the controller 80 via the wires 82 that connect each of the measurement devices 70 to the controller 80.

Each of the measurement devices 70 is configured to provide an output that is characteristic of a contact force between the measurement device 70 and the tubular member 14. Each measurement device 70 can be a sensor that detects force, pressure, and/or strain and generates an electrical signal representative of the force, pressure, or strain. For example, each measurement device 70 can be a diaphragm sensor that includes a diaphragm or membrane fluidly separating a vessel of known reference pressure from a space that is open to the measured pressure. An imbalance between the measured pressure and the reference pressure deforms the diaphragm of such a sensor, and the deformation can be measured by a strain gage, an indicator needle that is mechanically coupled to the diaphragm, a linear variable differential transformer, or the like. For example, the measurement devices 70 can be miniature stainless steel diaphragm pressure sensors from Entran Devices, Inc. of Fairfield, N.J., such as those identified as models EPB-BO and EPB-CO. Various other types of sensors can also be used.

The outputs from the measurement devices 70 can be used to determine a measurement of the tubular member 14. In particular, a variation in the wall thickness of the tubular member 14 can be determined according to the outputs of the measurement devices 70. For example, a variation of the wall thickness around the circumference of the tubular member 14 can affect the stiffness of the tubular member 14. Generally, the wall of the tubular member 14 is stiffer at circumferential locations where the wall of the tubular member 14 is relatively thick, and the wall is less stiff at circumferential locations where the wall is relatively thin. Therefore, by detecting a variation in the outputs of the measurement devices 70 and, hence, the contact forces, the apparatus 10 can detect a variation in the thickness of the wall of the tubular member 14. For example, in operation, the template members 20, 30 can be closed by providing a force F, as indicated in FIG. 5, which can be provided by a weight, actuator, spring, or the like as discussed above.

The apparatus 10 is illustrated in FIG. 7 with the tubular member 14 disposed in the aperture 40 and, in particular, with a longitudinal portion indicated by reference label $D_2$ (FIG. 3) disposed in the aperture 40. For purposes of illustrative clarity, the variation in wall thickness around the circumference of the tubular member 14 is shown exaggerated in FIG. 7. With the template members 20, 30 in the closed position, as shown in FIG. 7, the contact ends 74 of the measurement devices 70 are located in contact with the tubular member 14. The radial location of each of the contact ends 74 can be sufficiently radially inward so that a compressive contact force is exerted by the measurement devices 70 on the tubular member 14, i.e., so that the tubular member 14 is at least slightly deformed by contact with the measurement devices 70. The contact forces between the tubular member 14 and the measurement devices 70 are influenced by the stiffness of the tubular member 14.

The outputs provided by the measurement devices 70 are referred to by reference labels $R_1$–$R_{18}$, as graphically illustrated in FIG. 7. FIG. 8 illustrates the magnitudes of the outputs $R_1$–$R_{18}$ according to the circumferential location of the measurement devices 70. The controller 80 can determine an equation of a line 84 that approximates the relationship between the outputs $R_1$–$R_{18}$ and the circumferential location of the measurement devices 70, e.g., using a conventional "best-fit" technique. Further, the controller 80 can use the outputs $R_1$–$R_{18}$ to determine a relationship that is illustrative of the thickness of the tubular member 14 at each circumferential location of the devices 70. For example, FIG. 9 illustrates the variation in wall thickness of the tubular member 14 as a function of the circumferential locations of the measurement devices 70, i.e., according to the outputs $R_1$–$R_{18}$. The controller 80 can determine the thickness of the tubular member 14 using the outputs $R_1$–$R_{18}$ according to a theoretically determined relationship therebetween, or using a relationship that is derived empirically. For example, an empirical relationship can be derived by correlating output values from the measurement devices 70 with wall thickness values determined by other measurement techniques such as mechanical measurement, ultrasonic measurement, and the like. The controller 80 can determine an equation of a line 86 that approximates the variation of the wall thickness around the circumference of the tubular member 70, as shown in FIG. 9.

The eccentricity of the tubular member 14 generally refers to the difference between the maximum wall thickness and the minimum wall thickness at a particular longitudinal position along the length of the tubular member 70. The eccentricity can be measured at various longitudinal positions of the tubular member 70. For example, the eccentricity can be determined at each of the longitudinal positions $D_1$–$D_8$ shown in FIG. 3. Thus, the eccentricity at longitudinal position $D_2$ is about 7 mm, i.e., the difference between the maximum thickness (14 mm, measured as output $R_9$) and the minimum thickness (7 mm, measured as outputs $R_1$ and $R_{18}$). FIG. 10 illustrates a variation of the eccentricity of the tubular member 70 along the longitudinal direction of the tubular member 70. The controller 80 can determine an equation of a line 88 that approximates the variation of the eccentricity along the length of the tubular member 70, as shown in FIG. 10.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for circumferentially measuring a tubular member, the apparatus comprising:
   first and second template members cooperably defining an aperture defining a cross-sectional reference shape of the tubular member, the first and second template members being configured to receive the tubular member in the aperture, at least one of the first and second members being adjustable such that the aperture is configured to be adjusted between open and closed positions, wherein at least one of the template members is capable of being at least partially closed to urge the tubular member to a cross-sectional shape corresponding to the reference shape of the aperture; and
   a measurement device configured to detect the relative position between the first and second template members, thereby measuring the relative adjustment of at least one of the members between the open and closed positions, a measurement of the measurement device being indicative of the cross-sectional size of the tubular member.

2. An apparatus according to claim 1 further comprising a hinge connection between the first and second template members, at least one of the template members thereby being rotatably adjustable relative to the other of the template members.

3. An apparatus according to claim 2 wherein the measurement device is configured to measure a gap between the first and second template members opposite the aperture from the hinge connection.

4. An apparatus according to claim 1 wherein the aperture is generally circular.

5. An apparatus according to claim 1 wherein the measurement device is an electronic device configured to automatically measure the relative position of the template members.

6. An apparatus according to claim 1 wherein the measurement device is configured to measure a gap between the first and second template members.

7. An apparatus according to claim 1 wherein the measurement device is configured to determine a diameter of the tubular member.

8. An apparatus according to claim 1 wherein each of the first and second template members includes at least two plates, each of the plates of the first template member defining a first portion of the aperture and being configured in a spaced relationship, each of the plates of the second template member defining a second portion of the aperture and being configured in a spaced relationship.

9. An apparatus according to claim 1 further comprising an urging device configured to apply a predetermined force to the members to urge the members toward the closed position.

10. An apparatus for circumferentially measuring a tubular member, the apparatus comprising:
    first and second rigid template members cooperably defining an aperture having a generally circular cross-sectional reference shape, the first and second template members being configured to receive and substantially contact a majority of an outer circumference of the tubular member in the aperture, the first and second members being hingedly connected such that the aperture is configured to be adjusted between open and closed positions; and
    a measurement device configured to detect a gap between the first and second template members, thereby measuring the relative adjustment of the template members between the open and closed positions, a measurement of the measurement device being indicative of the cross-sectional size of the tubular member.

11. An apparatus according to claim 10 wherein the measurement device is positioned opposite the aperture from a position of a hinge connecting the first and second template members.

12. An apparatus according to claim 10 wherein the measurement device is an electronic device configured to automatically measure the relative position of the template members.

13. An apparatus according to claim 10 wherein the measurement device is configured to determine a diameter of the tubular member.

14. An apparatus according to claim 10 wherein each of the first and second template members includes at least two plates, each of the plates of the first template member defining a first portion of the aperture and being configured in a spaced relationship, each of the plates of the second template member defining a second portion of the aperture and being configured in a spaced relationship.

15. An apparatus according to claim 10 further comprising an urging device configured to apply a predetermined force to the members to urge the members toward the closed position.

16. A method for circumferentially measuring a tubular member, the method comprising:
    inserting the tubular member into an aperture defined by first and second cooperable template members;
    adjusting at least one of the template members to at least partially close the aperture, thereby urging the tubular member to a cross-sectional shape corresponding to a reference shape of the aperture;
    measuring the relative position between the first and second template members; and
    determining a cross-sectional size of the tubular member according to the relative position of the first and second template members.

17. A method according to claim 16 further comprising providing the template members, the first template member including at least two plates defining a first portion of the aperture, each of the plates of the first template member being configured in a spaced relationship, the second template member including at least two plates defining a second portion of the aperture, each of the plates of the second template member being configured in a spaced relationship.

18. A method according to claim 16 wherein said adjusting step comprises rotating at least one of the template members about a hinge connection between the first and second template members.

19. A method according to claim 18 wherein said measuring step comprises measuring a gap between the first and second template members at a position opposite the aperture from the hinge connection.

20. A method according to claim 16 wherein said adjusting step comprises applying a predetermined force to the members to urge the members toward a closed position.

21. A method according to claim 16 wherein said adjusting step comprises urging the tubular member to a generally circular cross-sectional shape.

22. A method according to claim 16 wherein said measuring step comprises measuring a gap between the first and second template members.

23. A method according to claim 16 further comprising configuring an electronic measurement device to measure the relative position of the template members and wherein said measuring step comprises electronically measuring the relative position of the template members.

24. A method according to claim 16 wherein said determining step comprises determining a diameter of the tubular member.

25. An apparatus for measuring a tubular member, the apparatus comprising:
   first and second template members cooperably defining an aperture generally having a cross-sectional reference shape of the tubular member, the first and second template members being configured to receive the tubular member in the aperture, at least one of the first and second members being adjustable such that the aperture is configured to be adjusted between open and closed positions; and
   a plurality of measurement devices positioned at circumferentially spaced locations around the perimeter of the aperture, the measurement devices configured to contact a majority of an outer circumference of the tubular member when the aperture is adjusted to the closed position, each of the measurement devices being configured to provide an output characteristic of a contact force between the measurement device and the tubular member such that the outputs of the measurement devices are indicative of a measurement of the tubular member.

26. An apparatus according to claim 25 further comprising a hinge connection between the first and second template members, at least one of the template members thereby being rotatably adjustable relative to the other of the template members.

27. An apparatus according to claim 25 wherein the aperture is generally circular.

28. An apparatus according to claim 25 wherein each measurement device is configured to detect at least one of a force, pressure, and stress in the measurement device that is representative of the stiffness of the tubular member.

29. An apparatus according to claim 25 wherein the apparatus is configured to determine a variation of the thickness of the tubular member according to the outputs of the measurement devices.

30. An apparatus according to claim 25 further comprising an urging device configured to apply a predetermined force to the members to urge the members toward the closed position.

31. An apparatus according to claim 25 where the apparatus comprises at least three measurement devices.

32. A method for measuring a tubular member, the method comprising:
   inserting the tubular member into an aperture defined by first and second cooperable template members;
   adjusting at least one of the template members to at least partially close the aperture, thereby positioning a plurality of measurement devices disposed on the template members in contact with a majority of an outer circumference of the tubular member;
   providing a plurality of outputs characteristic of contact forces between the measurement devices and the tubular member at a plurality of circumferential locations of the tubular member; and
   determining a measurement of the tubular member according to the outputs.

33. A method according to claim 32 wherein said adjusting step comprises rotating at least one of the template members about a hinge connection between the first and second template members.

34. A method according to claim 32 wherein said adjusting step comprises applying a predetermined force to the members to urge the members toward a closed position.

35. A method according to claim 32 wherein said measuring step comprises detecting at least one of a force, pressure, and stress that is representative of the stiffness of the tubular member.

36. A method according to claim 32 wherein said determining step comprises determining a variation of the thickness of the tubular member according to the outputs.

* * * * *